(12) United States Patent
Hashemi

(10) Patent No.: US 6,529,249 B2
(45) Date of Patent: *Mar. 4, 2003

(54) VIDEO PROCESSOR USING SHARED MEMORY SPACE

(75) Inventor: Mark Vahid Hashemi, Milpitas, CA (US)

(73) Assignee: Oak Technology, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,424

(22) Filed: Mar. 13, 1998

(65) Prior Publication Data

US 2002/0071060 A1 Jun. 13, 2002

(51) Int. Cl.[7] ................................................. H04N 9/64
(52) U.S. Cl. ....................... 348/714; 348/715; 348/716; 348/718; 345/541; 345/543
(58) Field of Search ................................ 348/711, 714, 348/715, 716, 717, 718, 719, 720; 345/514, 515, 518, 519, 541, 543; 358/147; H04N 9/64

(56) References Cited

U.S. PATENT DOCUMENTS

| | | | | |
|---|---|---|---|---|
| 3,860,952 A | * | 1/1975 | Tallent et al. ............... | 348/498 |
| 4,109,276 A | * | 8/1978 | Hopkins, Jr. et al. ....... | 348/498 |
| 4,110,785 A | * | 8/1978 | Dischert ...................... | 348/498 |
| 4,496,976 A | * | 1/1985 | Swanson et al. .............. | 34/564 |
| 4,713,693 A | * | 12/1987 | Southworth et al. ......... | 348/579 |
| 5,053,864 A | * | 10/1991 | Thompson ................... | 348/717 |
| 5,253,118 A | * | 10/1993 | Konno .......................... | 386/86 |
| 5,568,165 A | * | 10/1996 | Kimura ....................... | 345/185 |
| 5,717,461 A | * | 2/1998 | Hoogenboom ............... | 348/394 |
| 5,731,852 A | * | 3/1998 | Lee .............................. | 348/719 |
| 5,793,445 A | * | 8/1998 | Lum et al. ................... | 348/720 |
| 6,141,055 A | * | 10/2000 | Li ................................ | 348/446 |
| 6,259,481 B1 | * | 7/2001 | Fimoff et al. ................ | 348/456 |

* cited by examiner

Primary Examiner—John Miller
Assistant Examiner—Linus H. Lo
(74) Attorney, Agent, or Firm—Townsend and Townsend and Crew LLP; Harry K. Woodward

(57) ABSTRACT

Memory requirements in a video processor and display system are reduced by storing in memory processed video signals for a plurality of regions of a picture, processing video signals for additional regions of a picture while stored video signals are retrieved in controlling a display, and then storing the newly processed video signals in the memory space occupied by the retrieved video signals. An entire reconstructed frame of image signals is not needed in order to begin the display of the same frame, certain regions of the frame can be displayed while other regions are still being reconstructed. Overwrite protection is provided for stored image signals until the stored image signals are retrieved for image display.

3 Claims, 3 Drawing Sheets

VIDEO PROCESSOR USING SHARED MEMORY SPACE

BACKGROUND OF THE INVENTION

This invention relates generally to video data processing and display, and more particularly the invention relates to a video processor system having reduced memory capacity requirements through the sharing of physical memory space.

A video picture is created by scanning a display surface line-by-line from top to bottom, such as by an electron beam scanning a phosphor-coated surface. Video processing and display are based on industry standards such as NTSC in North America, and PAL in Europe. In the NTSC standard, one picture or frame comprises two interlaced fields, with each field having 240 scan lines and a frame having 480 scan lines. Each scan line has 704 picture elements or pixels with the light intensity of a pixel being defined by an 8-bit digital code. Each frame is scanned 30 times per second, therefore, 60 interlaced fields are scanned per second. Each NTSC frame requires 506,880 bytes of data; a PAL frame requires 608,256 bytes of data. Additional memory storage is required in processing compressed data, such as according to the MPEG standard, to recover the full video data. Thus, the memory requirements of a video processor system can become enormous.

The present invention reduces required memory storage capacity by reconstructing part of a field or frame of data while other parts of the field or frame data are being displayed, the reconstructed data then being stored by overwriting the displayed data in memory.

SUMMARY OF THE INVENTION

In accordance with the invention, a video processor reconstructs digital video data for a picture field or frame while the field or frame is being displayed. Once a portion of the picture is displayed, the memory location for the displayed portion can be reused for the latest reconstructed data.

More particularly, in accordance with one embodiment of the invention, a picture frame is divided into a plurality of regions, such as 6 regions from top to bottom of the frame. The scan lines for a first or top field and for a second or bottom field thus define 12 logical regions; 6 for the top field and 6 for the bottom field. In accordance with one feature of the invention, the memory for storing pixel data for the scan lines can have fewer physical storage regions than there are picture regions. For example, 9 memory regions can be used for storing the 12 picture regions. As. stored data for scan lines is read for scanning a display surface, the data is erased or overwritten as the memory storage area becomes available for newly calculated data. Thus, an index or pointers to the storage locations are continually updated as displayed data is erased and new data is stored.

Processor speed in calculating new video (pixel) data necessarily must be at least as fast as the accessing of video data for imaging in order to provide the frame or field data as a frame or field is being displayed. Attendant with the increased processor speed is a reduction in required memory capacity.

The invention and objects and features thereof would be more readily apparent from the following detailed description and dependent claims when taken with the drawing.

DETAILED DESCRIPTION OF THE ILLUSTRATIVE EMBODIMENTS

Figure 1:
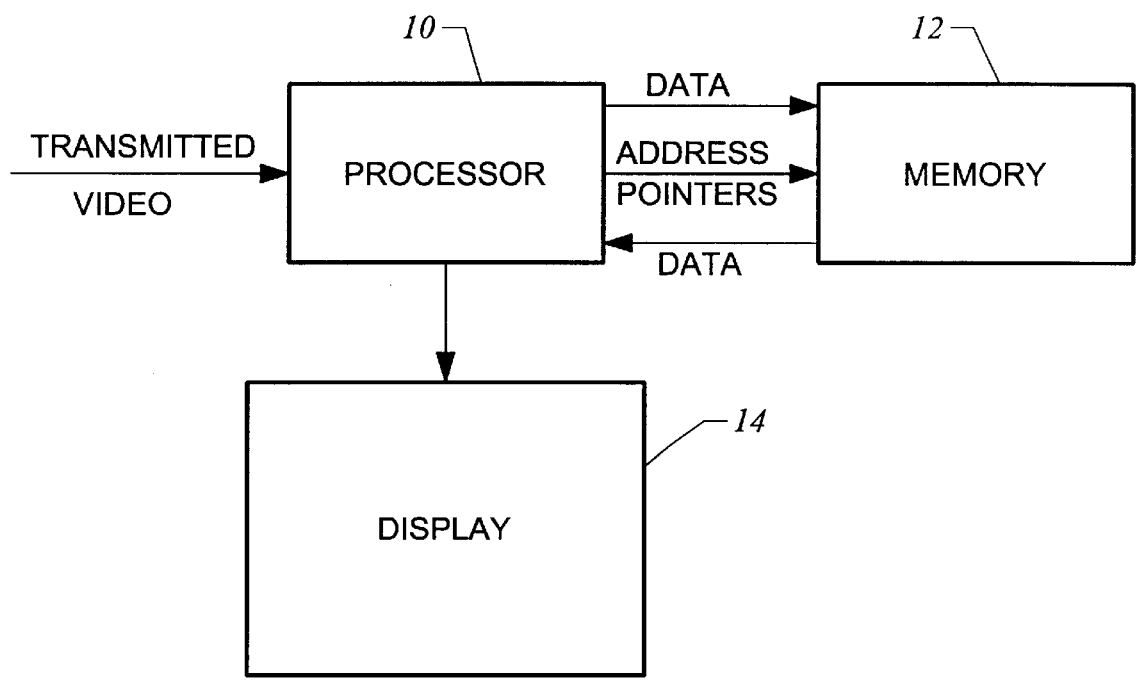
FIG. 1 is a functional block diagram of a video processor and display system.

FIG. 1 illustrates a functional block diagram of a video processing system in which a processor 10 receives transmitted video data, which can be compressed according to the JPEG standard, for example, the processor reconstructing the video data for storage in a memory 12 along with address pointers identifying the location of the data in memory. Thereafter, data is retrieved from memory by the processor and is used in controlling the display of an image on display 14, which can be a raster scanned electron beam impinging on a phosphor-coated surface.

Figures 2, 3A, 3B, 4:
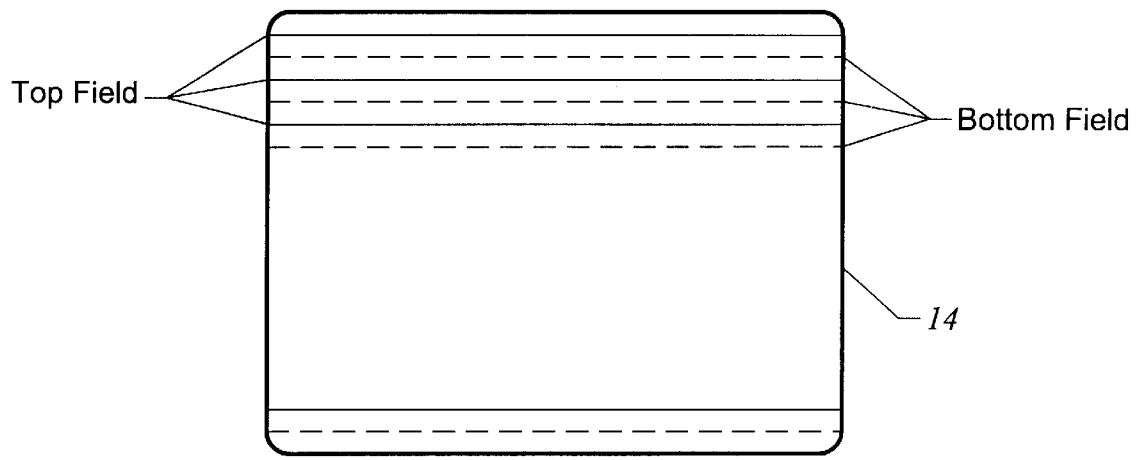
FIG. 2 illustrates the raster scan of a video display using two interlace fields (top, bottom) per video frame.
FIGS. 3A, 3B illustrate a picture frame divided into 12 regions (T0–T5, B0–B5).
FIG. 4 illustrates the division of memory into 9 partitions (0–8) for storing video data for the picture regions of FIGS. 3A, 3B.

FIG. 2 illustrates a displayed picture on display 14 with the picture being defined by scanning electron beams in a first or top field and then in a second or bottom field with the scan lines of the two fields being interleaved, as shown. As noted above, each frame is scanned 30 times per second according to the NTSC standard, therefore, 60 interlaced top and bottom fields are scanned per second. As shown in FIGS. 3A and 3B, each of the top field and the bottom field has 6 field regions for a total of 12 field or picture regions, T0–T5 and B0–B5.

In accordance with the invention, memory 12 is divided into a plurality of storage regions such as nine 9 regions as illustrated in FIG. 4. In order to limit the capacity of the memory, processor 10 generates video control data for storage in memory 12 as other data is retrieved from memory 12 for controlling display 14. For example, in FIG. 4, as the video data is retrieved from memory regions 0 and 1 for the first two top field regions, T0, T1, the image data for bottom field regions B3, B4 are processed for storage in memory regions 0, 1 from which video data T0, T1 has been retrieved. Thus, data is continually cycled through the memory for temporary storage until retrieved for display image control. The entire reconstructed picture frame is not needed in order to begin the display of the same frame. Certain regions of the frame can be displayed while control data for other regions are still being reconstructed. In essence, regions of the display are being reconstructed while other regions are being displayed. In accordance with the invention, overwrite protection is provided for stored image data until the reconstructed regions are displayed.

Figure 5:
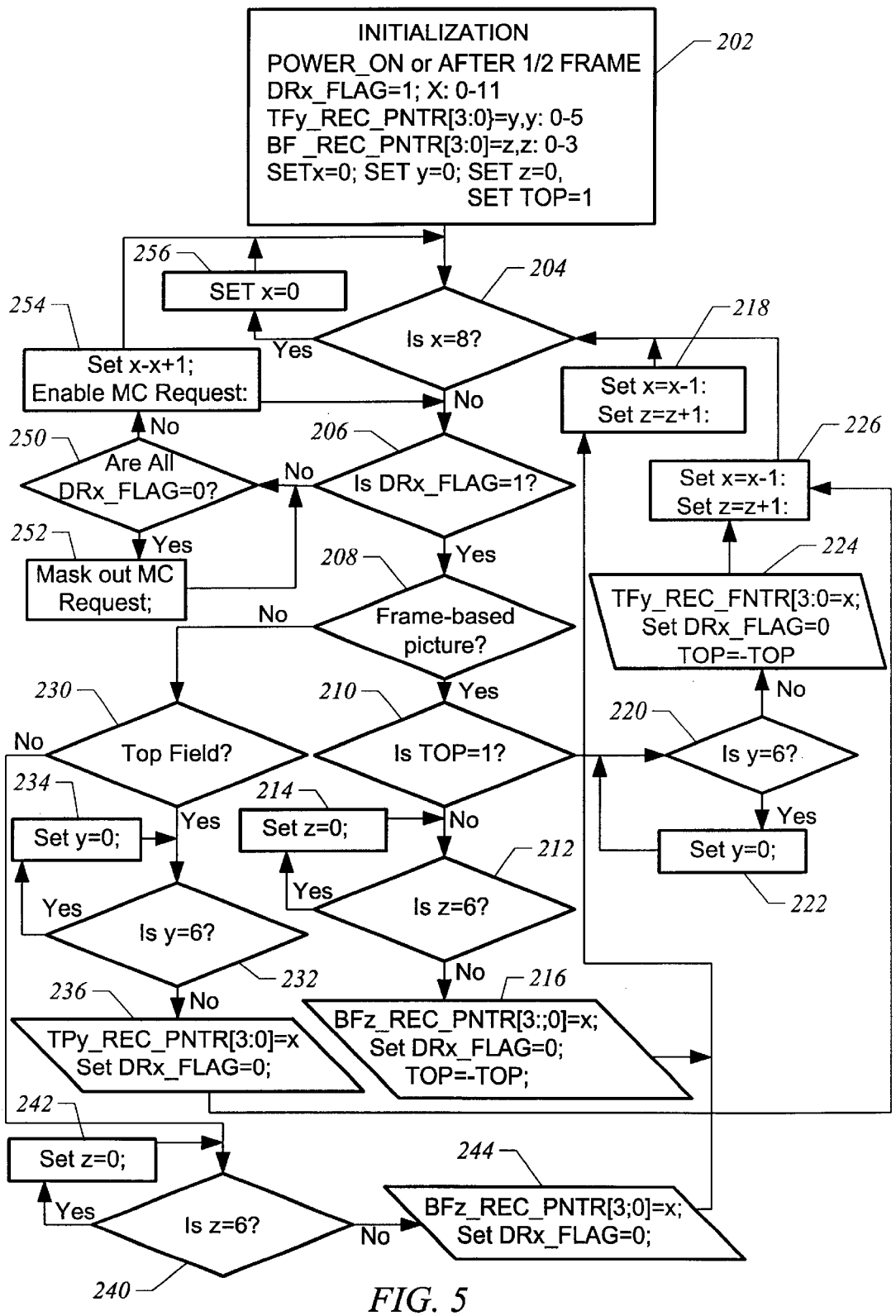
FIG. 5 illustrates a flow diagram for calculating pointers to memory storage locations for identifying video data for picture regions stored therein.

FIG. 5 is a flow diagram for the procedure in calculating pointers to physical memory partitions in which frame or field video signals are stored. In the following description of the flow diagram of FIG. 5, the following glossary of terms is used:

1. DRx: Physical DRAM partition. Every frame is divided into 12 equal DRAM partitions (DR0 through DR11).
2. FRx: Display Frame partition. Every display frame is divided into 6 equal partitions (FR0 through FR5). Note that every display partition includes both top and bottom field portion.
3. Field-based picture: Picture bit stream that has been encoded using two fields of a picture frame. Field motion compensation is used only in MPEG2.

4. Frame-based picture: Picture bit stream that has been encoded using the entire frame picture. This is related to the frame motion compensation that is used both in MPEG1 and MPEG2.
5. Progressive display: This is the type of display format where the entire frame is raster scanned.
6. Interlace display: This is the type of display format where the two fields of a frame picture are raster scanned separated by a field period (one half of the frame period).
7. TFx_REC_PNTR[3.0]: Top field reconstruction region pointers (TF0_REC_PNTR[3.0] through TF5_REC_PNTR[3.0].
8. UFx_REC_PNTR[3.0]: Bottom field reconstruction region pointers (UF0_REC_PNTR[3.0] through UF5_REC_PNTR[3.0]).
9. MB_HEIGHT[5.0]: Decoded picture height based on number of macro blocks (16×16).
10. RGN_HEIGHT[1.0]: DRAM partition height based on number of macro blocks.
11. B_FRM_BASE_ADDR[15.0]: The memory physical address where the B-frame storage starts in 8-byte increments.
12. DRx_FLAG: The DRAM partition status flag, when a one it indicates that the region is available for reconstruction, when a zero it indicates that the region has been fully reconstructed and is ready for display.
13. TF_xBASE_ADDR[19.0]: The physical address of starting location of the individual top field (DRAM) partitions.
14. UFx_BASE_ADDR[19.0]: The physical address of starting location of the individual bottom field memory (DRAM) partitions.

Referring to the flowchart depicted in FIG. 5, upon start of B-frame sequence in step 202 all regions are available for reconstruction and all the DRx_FLAGS (DR0_FLAG through DR7_FLAG) are set to 1. The x variable is for the field memory pointer the y variable is for the top field and the z variable is for the bottom field. Step 204 determines if all 8 regions have been reconstructed. If not, then step 206 checks to determine if the DRx_FLAG associated with the region is 1, meaning that the region is free for reconstruction. If the DRx_FLAG is free for reconstruction, step 208 determines if the reconstruction is performed on a frame-based picture as opposed to a field-based picture, and if so transfer the processing to step 210 which determines if the TOP value is 1.

If TOP is not 1, step 212 determines if the entire bottom field has been reconstructed by checking if z is 6. If yes, then step 214 sets z to 0 and then step 212 passes the processing to step 216. Step 216 sets pointer UFz_REC_PNTR[3.0] to x and resets the DRx_FLAG to 0 indicating that the region is ready for display and is not free for reconstruction. Then, step 218 increments x and z and returns the processing to step 204.

If TOP is 1, step 220 determines if the entire top field has been reconstructed by checking if y is 6. If yes, then step 222 sets y to 0 and the step 220 passes the processing to step 224. Step 224 sets pointer TFy_REC_PNTR[3.0] to x and resets the DRx_FLAG to 0 indicating that the region is ready for display and is not free for reconstruction. Then, step 226 increments x and z and returns the processing to step 204.

When the video processor determines that the video is not a frame-based picture in step 208, step 230 determines if the video information is for the top field. If so, step 232 determines if the entire top field has been reconstructed by checking if y is 6. If yes, then step 234 sets y to 0 and then step 232 passes the processing to step 236. Step 236 sets pointer TFy_REC_PNTR[3.0] to x and resets the DRx_FLAG to 0 indicating that the region is ready for display and is not free for reconstruction. Then, step 226 increments x and y and returns the processing to step 204.

When step 206 determines that the DRx_FLAG is not set to 1, step 250 determines is all DRx_FLAGS are set to 0. If so, all MC requests are masked out and the processing returns to step 250. It should be noted that the mechanism by which the reconstruction is halted in step 250, when no region is available for decoding, is done by masking the MC (Motion Compensation Module) request to write the reconstructed Block back to DRAM. This method is very easy and may be used both by Microcode and Hardware solution. When a DRx_FLAG is set to 0 because a region is free for reconstruction, step 250 passes the processing to step 254 which increments x and enables the MC request. Then, step 254 returns the processing to step 204. To perform video processing for the NTSC standard, 60 fields per second are required. To achieve this data rate, each region is reconstructed in less-than 2.8 msec. Therefore, an entire top or bottom field is reconstructed in less than the required 16.66 msec.

If step 230 determines that the video information is not for the top field, step 240 determines if the entire bottom field has been reconstructed by checking if z is 6. If yes, then step 242 sets z to 0 and then step 240 passes the processing to step 244. Step 244 sets pointer UFz_REC_PNTR[3.0] to x and resets the DRx_FLAG to 0 indicating that the region is ready for display and is not free for reconstruction. Then, step 218 increments x and z and returns the processing to step 204.

There has been described a video processor and display system in which memory space is reduced by the recycling of memory storage locations for the storage of processed video signals while other video signals are retrieved for display control. The total memory capacity can be less than the video image data required for a complete picture reconstruction. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:
1. A video processor and display system comprising:
a) a processor for receiving and processing video signals to provide digital display control signals for a first plurality of display frame regions, said video signals including two fields of interlaced raster scan lines,
b) a memory coupled to the processor for storing said digital display control signals, said memory having a storage capacity of one field of a frame and a portion of a second field of a frame but less than video display signals for one complete display picture frame, said memory including means to prevent erasure of stored video signals until the stored video signals are retrieved for video display control, and then allowing new video data for part of a display picture frame to write over the retrieved video signals for another part of the display picture frame, whereby new video signals for a picture frame are being stored as other video signals for the picture frame are being retrieved, said memory being divided into a second plurality of memory regions, said second plurality being different in number from said first plurality of display frame regions, said processor generating pointers to said second plurality of memory regions for video signals corresponding to one of said first plurality of display frame regions, and c) a video display for receiving video signals from said memory for use in controlling a raster scan in the display, said display being divided into the first plurality of display frame regions, said processor processing video signals for one of said first plurality of display frame regions while video signals are retrieved from memory for another one of the first plurality of display frame regions.

2. The video processor and display system is defined by claim 1 wherein said first plurality of display frame regions includes 6 top field regions and 6 bottom field regions.

3. The video processor and display system as defined by claim 2 wherein said second plurality of memory regions comprises 9 regions, the 12 field regions of video signals cycling through said 9 regions of memory with video signals retrieved from a region of memory for picture frame control being replaced by newly processed video signals for the picture frame.

* * * * *